(12) United States Patent
Buschmann et al.

(10) Patent No.: US 10,145,145 B2
(45) Date of Patent: Dec. 4, 2018

(54) ILLUMINATION ELEMENT FOR A VEHICLE

(71) Applicant: Huf Huelsbeck & Fuerst GmbH & Co. KG, Velbert (DE)

(72) Inventors: Gerd Buschmann, Velbert (DE); Thomas Metzner, Holzgerlingen (DE); Markus Klameth, Altdorf (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 156 days.

(21) Appl. No.: 15/129,175

(22) PCT Filed: Mar. 5, 2015

(86) PCT No.: PCT/DE2015/100087
§ 371 (c)(1),
(2) Date: Sep. 26, 2016

(87) PCT Pub. No.: WO2015/144128
PCT Pub. Date: Oct. 1, 2015

(65) Prior Publication Data
US 2018/0179783 A1   Jun. 28, 2018

(30) Foreign Application Priority Data

Mar. 26, 2014 (DE) .................. 10 2014 004 334

(51) Int. Cl.
*E05B 17/10* (2006.01)
*B60Q 1/50* (2006.01)
(Continued)

(52) U.S. Cl.
CPC .............. *E05B 17/10* (2013.01); *B60Q 1/50* (2013.01); *B60R 13/005* (2013.01); *E05B 81/78* (2013.01);
(Continued)

(58) Field of Classification Search
CPC .......... E05B 17/10; E05B 81/78; E05B 83/18; B60Q 1/50; B60R 13/005; E05Y 2400/86;
(Continued)

(56) References Cited

U.S. PATENT DOCUMENTS 7,717,584 B1 * 5/2010 Tuan ....................... G09F 13/22
362/103
2003/0216817 A1   11/2003 Pudney
(Continued)

FOREIGN PATENT DOCUMENTS

DE   102004050297 A1   4/2006
DE   102007002024 A1   7/2008
(Continued)

OTHER PUBLICATIONS

International Searching Authority, International Search Report and Written Opinion for PCT Application No. PCT/DE2015/100087, dated Jun. 15, 2016.

*Primary Examiner* — Laura Tso
(74) *Attorney, Agent, or Firm* — Honigman Miller Schwartz and Cohn LLP; Matthew H. Szalach; Jonathan P. O'Brien

(57) ABSTRACT

The disclosure relates to an illumination element for a vehicle. The illumination element comprises an outer trim part, illumination means, and a transparent cover arrangement between the trim part and the illumination means. The disclosure also relates to a vehicle comprising at least one such illumination element, and a control element for a device for opening or unlocking a vehicle.

17 Claims, 2 Drawing Sheets

Figure 1:
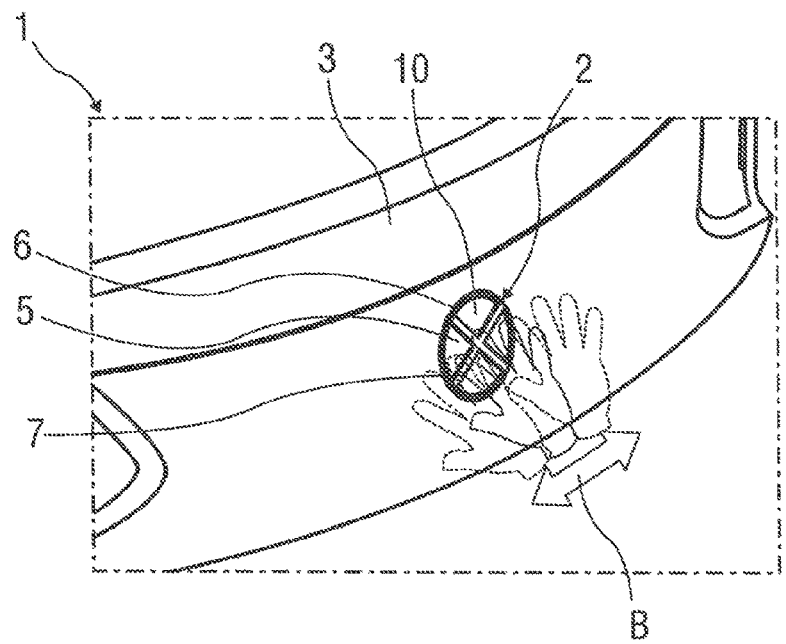

(51) Int. Cl.
*B60R 13/00* (2006.01)
*E05B 81/78* (2014.01)
*E05B 83/18* (2014.01)
*E05F 15/73* (2015.01)
*F21V 23/04* (2006.01)

(52) U.S. Cl.
CPC .............. *E05B 83/18* (2013.01); *E05F 15/73* (2015.01); *E05Y 2400/822* (2013.01); *E05Y 2400/86* (2013.01); *E05Y 2800/106* (2013.01); *E05Y 2900/546* (2013.01); *E05Y 2900/548* (2013.01); *F21V 23/0471* (2013.01)

(58) Field of Classification Search
CPC ......... E05Y 2800/106; E05Y 2900/548; F21Y 23/0471
USPC .................................................. 362/496, 501
See application file for complete search history.

(56) References Cited

U.S. PATENT DOCUMENTS

| | | | |
|---|---|---|---|
| 2010/0007463 | A1 | 1/2010 | Dingman |
| 2013/0335994 | A1* | 12/2013 | Mulder ............... F21V 9/00 362/555 |
| 2013/0335997 | A1* | 12/2013 | Roberts ............... G09F 21/04 362/583 |
| 2015/0138809 | A1* | 5/2015 | Salter ............... B60R 13/005 362/510 |
| 2016/0185284 | A1* | 6/2016 | Salter ............... B60R 13/005 362/510 |

FOREIGN PATENT DOCUMENTS

| | | |
|---|---|---|
| DE | 102012004742 A1 | 9/2013 |
| EP | 2067665 A1 | 6/2009 |
| WO | WO-2015043808 A1 | 4/2015 |

* cited by examiner

ILLUMINATION ELEMENT FOR A VEHICLE

CROSS-REFERENCE TO RELATED APPLICATIONS

This application claims priority under 35 U.S.C. § 371 to Patent Cooperation Treaty Application No. PCT/DE2015/100087, filed Mar. 5, 2015, which claims priority to DE Application No. 102014004334.7, filed Mar. 26, 2014, the entire contents of which are incorporated herein by reference.

The invention concerns a lighting element for a vehicle, for example for a device for opening or unlocking the vehicle.

The invention additionally concerns a vehicle that includes at least one such lighting element, and a control element for a device for opening or unlocking a vehicle that includes such a lighting element.

Known from DE 10 2004 050,297 A1 is a device for motor vehicles having a camera for image acquisition, having a housing, having a pivoting protection element, and having a drive. Using the drive, the protection element can be pivoted into a first position that covers the camera in the housing, in which the camera is deactivated, and into a second position in which the camera can be activated, and back. In this design, the arrangement has a lock cylinder of a closure for a lid or a hood of the motor vehicle. The arrangement additionally has a switch of a closure for a lid or a hood of the motor vehicle, wherein the switch is part of the closure of the lid.

The object of the invention is to specify a novel lighting element for a vehicle, for example, for a device for opening or unlocking the vehicle, a novel vehicle comprising at least one such lighting element, and a novel control element for a device for opening or unlocking a vehicle.

With regard to the lighting element, the object is attained by the features specified in claim 1; with regard to the vehicle, it is attained by the features specified in claim 5; and with regard to the control element, it is attained by the features specified in claim 9.

Advantageous embodiments of the invention are the subject matter of the dependent claims.

The lighting element for a vehicle, for example, for a device for opening or unlocking the vehicle, comprises, according to the invention, the following components:
 an external trim part,
 a lighting means, and
 a transparent cover arrangement located between the trim part and the lighting means.

The lighting element is characterized by an especially small installation space requirement.

Exemplary embodiments of the invention are described in detail below on the basis of drawings.

Figure 2:
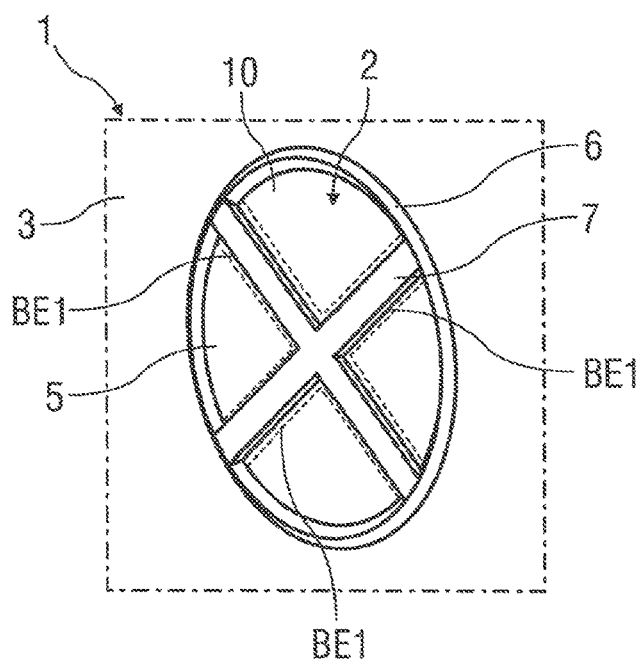
Figure 3:
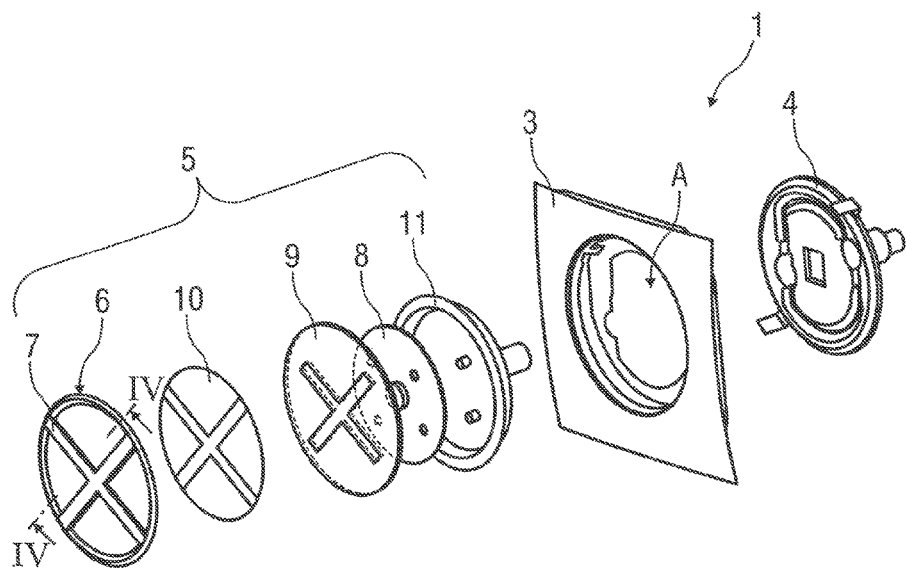
Figure 4:
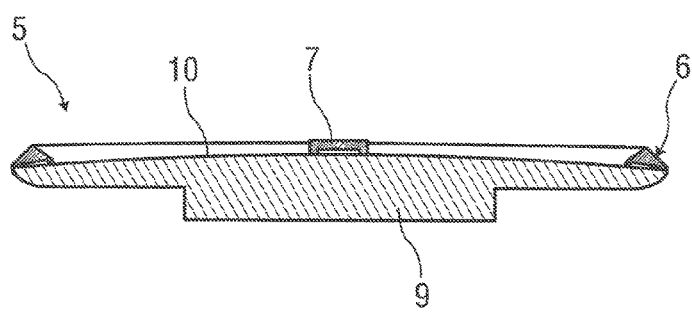

In the drawings:

FIG. 1 schematically shows a perspective view of a first section of a vehicle according to the invention with a control according to the invention, FIG. 2 schematically shows a perspective view of a second section of the vehicle according to the invention with the control according to the invention, FIG. 3 schematically shows an exploded view of the second section of the vehicle according to the invention with the control according to the invention, and FIG. 4 schematically shows a cross-sectional representation of a part of a lighting element of the control element.

Corresponding parts are labeled with the same reference symbols in all figures.

In FIGS. 1 to 3, sections of a vehicle 1 according to the invention with a control element 2 according to the invention are shown in various views.

The control element 2 here is part of a device, not shown in detail, for opening or unlocking the vehicle 1, and is integrated into a section A of a trunk lid 3 of the vehicle 1. In this design, the control element 2 is connected to a lock arrangement 4 that is implemented as a so-called lock plate of the device for opening or unlocking the vehicle 1. The lock arrangement 4 is made, for example, of polycarbonate or acrylonitrile butadiene styrene copolymer (abbreviated as ABS).

The control element 2 includes, in a manner not shown in detail, at least one sensor, for example a capacitive sensor, for detecting motions B of a user, for example hand motions, wherein a control signal is generated by means of the sensor, based on which a central locking system is actuated and/or a door or gate, for example the trunk lid 3, is automatically opened by means of the device for opening or unlocking the vehicle 1. In this design, the sensor is, in particular, connected to an analysis unit, by means of which the motions B detected by the sensor are analyzed, and as a function of defined gestures that are recognized, functions of the device for opening or unlocking the vehicle 1 associated with these gestures are executed.

In this way, contactless operation of the device for opening or unlocking the vehicle 1 by means of the control element 2 is possible for the user so that the user can avoid getting his hands dirty.

The control element 2 additionally includes a lighting element 5, wherein, depending on a function executed by the device on account of the motion B of the user, in particular hand motion, a light signal signaling the function or signaling a state of the device established by the function is produced by means of the lighting element 5.

In particular, a light signal that gives the user feedback about the function executed based on his motion B is emitted by the lighting element 5. For example, a light signal with a green color is emitted for the user upon opening of the central locking system, a door, or a gate. Upon locking of the central locking system, the light signal is emitted with the color red, for example. This means that different light colors can be emitted by the lighting element 5 as a function of an opening and locking process. In addition, so-called "coming home lighting" can also be implemented by means of the lighting element 5.

The lighting element 5 includes an external trim part 6 that includes a manufacturer emblem 7 made, for example, of polycarbonate or acrylonitrile butadiene styrene copolymer (abbreviated as ABS). The manufacturer emblem 7 is only shown in stylized form here, and can instead have any conceivable shape. The trim part 6 here is chrome-plated at least on a visible side, and can be provided with a transparent cover in a manner not shown in detail.

In addition, the lighting element 5 includes a lighting means 8 that includes one or more light-emitting diodes, for example, in particular organic light-emitting diodes, so-called OLEDs. The lighting means 8 is held on the back by a termination assembly 11 made, for example, of polycarbonate or acrylonitrile butadiene styrene copolymer (abbreviated as ABS).

Located between the trim part 6 and the lighting means 8 is a transparent cover arrangement 9 made, for example, of polymethyl methacrylate. In different exemplary embodiments, the cover arrangement 9 can also be designed to be merely translucent.

Located on the cover arrangement 9 is a so-called plate arrangement 10, likewise made, for example, of polycarbonate or acrylonitrile butadiene styrene copolymer (abbreviated as ABS), which in particular has the same external color as the vehicle 1. In particular the plate arrangement 10 is painted. The plate arrangement 10 is designed such that intermediate spaces of the cover arrangement 9 that are not concealed by the manufacturer emblem 7 are covered in such a manner that light generated when the cover arrangement 9 is illuminated by the lighting means 8 can be coupled out in the region BE1 by edges of the manufacturer emblem 7. This means that a silhouette of the manufacturer emblem 7 is illuminated, and thus visually highlighted.

In exemplary embodiments that are not shown, different designs and shapes of the plate arrangement 10 are also possible so that any desired light patterns can be created.

All components of the control element 2 and of the lighting element 5 are joined together in a frictional, integral, and/or positive manner, for example are adhesively bonded and/or laser welded.

The control element 2 makes it possible to give the user feedback about the executed functions by means of the light signals produced. Because of the fact that no moving mechanical parts are required to activate the locking and opening function, the control element 2 is distinguished from the solutions known from the prior art by an especially small installation space requirement. In addition, the control element 2 can be integrated into the outer shell or into the interior of the vehicle 1, in a very simple and visually appealing manner.

FIG. 4 shows a cross-sectional representation of a part of the lighting element 5 of the control element 2.

The invention claimed is:

1. A vehicle incorporating a lighting element comprising:
an external trim part;
a lighting means operable to produce light; and
a transparent cover arrangement located between the trim part and the lighting means,
wherein the lighting means is operable to omit different colors based on a state of a locking mechanism of a vehicle.

2. The vehicle of claim 1, wherein the trim part includes an insignia.

3. The vehicle of claim 2, wherein the insignia is an emblem of a vehicle manufacturer.

4. The vehicle of claim 1, wherein the trim part includes a chrome-plated surface.

5. The vehicle of claim 4, wherein the chrome-plated surface is located on a visible side of the trim part.

6. The vehicle of claim 1, wherein the lighting element is integrated into a trunk lid of the vehicle.

7. The vehicle of claim 1, wherein the lighting element is connected to a lock arrangement of a device for opening or unlocking the vehicle.

8. The vehicle of claim 1, wherein the lighting means is operable to omit different light colors.

9. A control element for a device for opening or unlocking the vehicle of claim 1.

10. The control element of claim 9, further comprising at least one sensor for detecting motions of a user.

11. The control element of claim 10, wherein the lighting element is operable to produce a light signal based on a function executed by the device on account of motions of the user.

12. The control element of claim 9, wherein the lighting element is operable to produce a light signal based on a state of the device.

13. A control element for a device for opening or unlocking a vehicle including a lighting element comprising:
an external trim part;
a lighting means operable to produce light; and
a transparent cover arrangement located between the trim part and the lighting means.

14. The control element of claim 13, further comprising at least one sensor for detecting motions of a user.

15. The control element of claim 14, wherein the lighting element is operable to produce a light signal based on a function executed by the device on account of motions of the user.

16. The control element of claim 13, wherein the lighting element is operable to produce a light signal based on a state of the device.

17. The control element of claim 13, wherein the lighting means is operable to omit different colors based on a state of a locking mechanism of the vehicle.

* * * * *